United States Patent [19]

Mills

[11] Patent Number: 5,683,953
[45] Date of Patent: Nov. 4, 1997

[54] COMPOSITION FOR THE TREATMENT OF SWIMMING POOL WATER

[76] Inventor: Dudley John Mills, 30 Hutchison Crescent, Kambah, A.C.T., Australia

[21] Appl. No.: 519,090

[22] Filed: Aug. 24, 1995

[30] Foreign Application Priority Data

Feb. 24, 1993 [AU] Australia ................................. PL7472
Oct. 22, 1993 [AU] Australia ................................. PM1981
Dec. 8, 1993 [AU] Australia ................................. PM2865

[51] Int. Cl.$^6$ ................................................. B01J 20/02
[52] U.S. Cl. ........................ 502/405; 502/303; 502/412; 210/723; 210/724; 210/681; 210/683; 210/685
[58] Field of Search ............................. 502/303, 405, 502/412; 210/723, 724, 681, 683, 685

[56] References Cited

U.S. PATENT DOCUMENTS

| | | | |
|---|---|---|---|
| 3,758,418 | 9/1973 | Leonard, Jr. | 502/303 |
| 3,850,835 | 11/1974 | Marantz et al. | 252/182 |
| 3,956,118 | 5/1976 | Kleber et al. | 210/45 |
| 4,746,457 | 5/1988 | Hassick et al. | 252/181 |
| 5,071,587 | 12/1991 | Perman | 252/181 |
| 5,500,131 | 3/1996 | Metz | 210/705 |

FOREIGN PATENT DOCUMENTS 25 20 210  11/1976  Germany .

OTHER PUBLICATIONS

S. Budavari, (Ed.), The Merck Index, An Encyclopedia of Chemicals, Drugs, and Biologicals, 5233, pp. 845–846, (1989).

Derwent Abstract Accession No. C86/076869, Class D15, JP,A,61111192 (Kurita Water Ind KK) 29 May 1986.

Derwent Abstract Accession No C88–096429, Class C04 D15 E37, JP,A,63151398 (Ebara Infilco KK) 23 Jun. 1988.

Ebara, English abstract of Japanese patent application 2–96776.

"Nutrient Inactivation as a Lake Restoration Procedure, Laboratory Investigations", National Technical Information Service, U.S. Department of Commece, Oct. 1974.

*Primary Examiner*—Glenn A. Caldarola
*Assistant Examiner*—Nadine Preisch
*Attorney, Agent, or Firm*—Foley & Lardner

[57] ABSTRACT

Methods and compositions are disclosed for treating swimming pool waters in order to remove one or more nutrients necessary for algal growth and to accelerate the breakdown of objectionable chloramines within chlorinated pool waters.

The target nutrients of preference are those containing phosphorus or nitrogen. Phosphorus nutrients are preferably removed by ion-exchange with finely divided lanthanum carbonate, or by direct precipitation in the pool with liquid lanthanum chloride. Nitrogen nutrients (including, in particular, chloramines) may be removed (possibly with the aid of catalysts and in separate reactors). The same reagents used to scavenge phosphates are useful in this regard, the nitrogen being released from the pool water as a nitrogenous gas.

To allow the fine lanthanum carbonates to be conveniently handled in the pool environment, they may be linked to larger carrier particles, such as those of diatomaceous earth, or they may be embedded within porous beads formed from polymers or gels. In this form the reagent can be either added to, retained within and backwashed from pool filters, or added directly to pools (with or without a flocculating agent) and sucked to waste after settling. A variety of formulations for these purposes is disclosed.

9 Claims, No Drawings

COMPOSITION FOR THE TREATMENT OF SWIMMING POOL WATER

TECHNICAL FIELD

This invention relates to compositions and methods for use in the treatment of swimming pool water. More particularly, it is concerned with the control of algal growth in chlorinated or unchlorinated fresh- or salt-water artificial swimming pools, and/or the reduction of the concentration of unpleasant chloramines in chlorinated pools.

The term 'algal growth' refers to the growth of aquatic algae and alga-like euglena species, together with the aquatic plant, animal or bacterial life-forms which are associated with them. These organisms may be free-floating or may attach to the walls and bottoms of swimming pools.

BACKGROUND TO THE INVENTION

Algal growth in swimming pools leads, first, to a coating of slime on the walls and bottom, then, to an unpleasant green discolouration of the water and, finally, to the proliferation of micro-organisms and other aquatic life forms, some of which may be pathogenic for humans. The conventional ways of controlling such growth are chemical and mechanical in nature. The chemical approach is to add toxins, such as chlorine and algacides, to the pool water to kill the algae. The mechanical approach is to scrub the bottom and sides of the pool, by hand or with a moving suction-head, to dislodge the algae and to pump the pool water through a filter to remove the free-floating or dislodged material. Almost all pool owners use both chemical and mechanical treatments, though many have reservations about the wisdom of using algacides in their pools, from the standpoint of the health of swimmers.

Pool owners generally recognise that the effort and expense needed to achieve a given level of control over algal growth increases with the age of a pool and with pool usage. It is also generally appreciated that the water of well-used pools tends to develop an unpleasant acrid odour and to irritate the eyes and skin of swimmers, it being known that this is due to relatively high concentrations of chloramines in such pools. The recommended treatment is an extended period of super-chlorination (during which the pool cannot be used), but the chloramine—and algal growth—problems soon return after such a treatment. The situation is essentially the same for fresh and salt pools.

In contrast to current practice, the present invention is based upon the simple idea that algae in swimming pools may be starved rather than poisoned in order to control their growth. This is done by removing from the pool water one or more dissolved nutrients essential for algal growth, such as those containing phosphorus and nitrogen.

The importance of phosphate as a critical algal nutrient in lakes and streams was charted in a series of definitive studies reported by Vollenweider in 1968 (OECD DAS/CSI/68.27). In the 1970s the US Environmental Protection Agency (EPA) commissioned a number of studies of the feasibility of nutrient inactivation in lakes [eg, EPA-660/3-74-032, October 1974—NTIS PB-239 969] by precipitation with the soluble salts of Al, La, Zr and Ti. In one reported experiment, $LaCl_3$ was formed by dissolving $La_2(CO_3)_3$ in HCl and added to water to precipitate phosphate as $LaPO_4$. There was some concern, however, about the toxicity of unreacted $LaCl_3$ in fish and other aquatic organisms. German patent No 2,520,210 to Altmann (1975) discloses the use of soluble rare earth salts, specifically $La(Na_3)_3$, to precipitate phosphate from swimming pool water, the liquid reagent being added to the bulk of the pool water. He suggests that the resultant fine suspension (which is quasi-stable and turns the pool milky) can be removed by filtration or by using conventional flocculants. But the sub-micron particles which form the suspension pass through most pool filters and require unacceptably large amounts of flocculant to bring down, resulting in excessive filter-blockages.

The general affinity of La and Zr for dissolved phosphates is well known and exploited in other arts. For example, La is used to tag or remove phosphate ions in cellular biology, particulate hydrous $ZrO_2$ is used to absorb phosphates from body fluids in kidney dialysis (eg, U.S. Pat. No. 3,850,835 to CCI Life Systems) and Japanese patent application No 296776 by Ebara discloses the use of particulate $ZrO_2$ and $TiC_2$ to remove phosphates from acidified waste liquors containing high concentrations of Al and Fe.

OBJECTIVE OF THE INVENTION

The objective of the invention is to provide improved methods and compositions for the removal of nutrients from swimming pools to facilitate the control of algal growth, and/or the reduction of unpleasant chloramines.

OUTLINE OF INVENTION

The nutrients which I most prefer to target are those containing phosphorus, particularly phosphate, and (to a lesser degree) those containing nitrogen (including chloramines), but a number of other nutrients may be targeted. In accordance with this invention, nutrients are removed from solution by contacting the pool water with a substantially insoluble particulate reagent that reacts with the nutrients to produce a substantially insoluble particulate reaction product. Preferably, the reagent is finely divided (<10 μm) and is linked to or incorporated in or on a substantially insoluble carrier material so that the reaction product is also linked to or incorporated in or on the carrier material. This composition (including reacted and unreacted reagent) is easily removed from the pool. The unreacted composition may be loaded into the pool filter, rather than the pool, to remove nutrient from the pool water as it is circulated through the filter. I have found, first, that insoluble lanthanide, yttrium and zirconium compounds (other than those containing phosphorus) are effective as reagents in scavenging phosphates from swimming pools for the purpose of controlling algal growth and, second, that these compounds (particularly the lanthanides) are useful in catalysing the breakdown of the unpleasant chloramines in pool water. Of particular interest as a reagent in both respects is finely-divided particulate $La_2(CO_3)_3$.

The phosphorus ions are removed from the pool water by exchange with the anions of the reagent. As the anion displaced by phosphate is not important, there are many candidate compounds available, but few are highly specific for phosphate and fewer still are capable of reacting substantially stoichiometrically when the concentration of phosphates in water is less than 10 ppb. I have found that lanthanum carbonate, $La_2(CO_3)_3$, and lanthanum oxide, $La_2O_3$, (which may form a precursor to the carbonate in pool water) are especially suitable.

Turning now to the problem of nitrogenous nutrients and chloramines: Besides being contributed by the sweat and urine of users, nitrogen is introduced into swimming pools, by the use of algacides based on amino complexes, flocculants based upon polyacrylamides or polyamines and nitrogenous garden fertilisers. The key nitrogenous nutrients are thus nitrates, nitrites and chloramines; chloramines being formed by the reaction of chlorine and ammonia I have found nitrogen concentrations around 15 ppm in many well-used pools where the effects of chloramines are objectionable to swimmers.

It is fortunate that the key nitrogenous nutrients—particularly, chloramines—happen to be chemically unstable and, therefore, may be removed by promoting their breakdown (releasing nitrogenous gas) with a suitable catalyst. The overall reactions involved include the following which can be considerably accelerated by the use of rare earth (and other) catalysts:

$NO_3^{2-}+2H^+ \rightarrow NO_2\uparrow+H_2O$
$NO_2^{2-}+2H^+ \rightarrow NO\uparrow+H_2O$
$2NO_2^{2-}+8H^+ \rightarrow N_2\uparrow+4H_2O$
$2NH_3+3Cl_2 \rightarrow 2N_2\uparrow+6HCl$ Ideally, catalysts for such reactions in pool water will have two possible oxidation states at about pH 7 which can be switched by nitrogen and chlorine ions to break down chloramines. Lanthanide elements, such as cerium, praseodymium, terbium and lanthanum can switch between +4 and +3 oxidation states at about neutral pH, the +4 cations of the catalyst acting as electron acceptors for electrons from the nitrogen (at −3) of chloramines, and the resultant +3 cation of the catalyst then being switched back to +4 in the presence of chlorine.

While it is difficult to remove sufficient nitrogen in this way to control algal growth (without the use of specialised reactors), I have found that the break down of chloramines in pool water is significantly accelerated by the presence of the above: mentioned lanthanides. Cerium and other rare earth catalysts are generally present in commercial grade lanthanum oxide to a minor degree. Thus, the acceleration of chloramine breakdown is a fortunate side-benefit of the use of commercial-grade lanthanum chloride, oxide or carbonate for the removal of phosphates from pool waters to control algal growth.

The matter of formulation of treatment compositions will now be considered. The precipitates produced using soluble lanthanides (eg the chlorides) have a very small particle size (<<5 μm). They therefore cloud the pool water, settle slowly and tend to block or pass through common pool filters. Similar problems arise from the use of commercial grade insoluble compounds (such as lanthanum oxide or lanthanum carbonate) in the ion-exchange process, as they have a significant proportion of very fine particles. However, such fine particles are highly reactive so that phosphate removal is rapid. I therefore prefer to use a variety of specially formulated ion-exchange compositions which offer a beneficial compromise between reactivity and ease of removal:

1: Using hydrocyclones or air classifiers, classified particulate ion-exchange material substantially composed of particles within the size range 10–50 μm may be produced. Such a material will remove phosphate from pool water as is settles over a few hours (eg, overnight) and can be vacuumed to waste or to the filter to remove it from the pool.

2 The particles of unclassified commercial-grade powders can be agglomerated into clumps larger than 100 μm (and, preferably, less than 2500 μm) and used in the same manner as the classified composition. Alternatively, the agglomerated composition may be added the pool filter. Agglomeration can be effected by mixing with a suitable binder such as polyacrylamide gel which thus forms the carrier of the composition. The amount of carrier/binder required is very small, between 0.01% and 1% by weight of the active agent generally being sufficient.

3 Fine reagent particles may be agglomerated with larger and essentially inert porous carrier particles, such as those of diatomaceous earth. Preferably, the conglomerate particles are at least 100 μm in size. (Agglomeration may be achieved with a binder as indicated above, the carrier particles and the binder forming the carrier in this case.)

4 The particles of unclassified commercial-grade powders may be incorporated within a carrier matrix, preferably a hydrophilic and porous organic or siliceous polymer, such as polystyrene or an aluminate-silicate gel. The resultant conglomerate particles hereinafter called beads) will normally have a relative density significantly greater than unity and will preferably have a particle size greater than 100 μm. Such a composition having a particle-size range of 150–2500 μm is well suited as a phosphate-adsorbing additive for pool filters.

The beads of the last-mentioned composition may be formulated to have a density significantly less than unity—that is, to float. This may be done by incorporating air into the beads. Such beads can be readily skimmed from the surface of the pool or collected in the skimmer-box.

Finally, commercial-grade powders may be formulated with flocculants which form the carrier and (when dispersed in the pool) capture the fines, linking them to the more coarse particles.

These methods of formulating particulate compositions are generally well known to those skilled in the handling of powdered materials and therefore need little further elaboration. It will also be well appreciated by those skilled in the art that such compositions can be presented as pastes or slurries rather than as free-flowing powders. Moreover, those skilled in the ion-exchange art will be aware that formulations employing suitably-sized reagents or beads can be held in a reactor column and cycled between phosphate-adsorption and reagent re-generation. For example, carrier particles containing 'spent' lanthanum can be conveniently regenerated by washing, first, with a hydroxide and/or carbonate solution at pH 10+ and then with a bicarbonate/carbonate solution at about pH 8 to regenerate lanthanum carbonate.

A variety of organic polymers suitable for use in the carrier matrix of the beads are known. Australian patent 534337 to ICI, for example, discloses a method for incorporating ferromagnetic, activated carbon and the like particulate ion-exchange absorbents within porous polymer beads for use in water treatment. This patent also discloses the use of weighting agents such as zircon to achieve the desired bead density. Australian patent 548852 to ICI and CSIRO discloses a 'plum-pudding' amphoteric ion-exchange resin incorporating synthetic ion-exchange components within a porous polymeric matrix. A process for incorporating non-polymeric agents into a porous polymeric matrix disclosed in these ICI patents. It involves adding minerals as fine powders to the monomeric reagents, solutions and/or emulsions to form a slurry which is then polymerised to form beads in which the particulate agent is incorporated in a dispersed condition.

I further envisage that polymer or siliceous beads can be mixed in a (preferably aqueous) solution containing a liquid pre-cursor which impregnates them so that the finely divided active agents can be formed in situ by precipitation from the pre-cursor. The pre-cursor may be, for example, lanthanum chloride, the precipitant could be sodium bicarbonate and the precipitated reagent could be lanthanum carbonate. The active agents may also be precipitated (in finely-divided particulate form) into or onto a porous particulate carrier (such as diatomaceous earth) of the desired particle size. They may be applied as a coating on the larger carrier particles by mixing in a slurry of a suitable binder such as polyacrylamide. The binder may be applied as a monomer which is polymerised in situ to hold the reagent particles in place, but the coating must be porous and hydrophilic.

As known in the art, the level of cross-linking and porosity of such polymer beads can be varied to suit the application. Beads intended for cycled ion-exchange columns need to be more robust than those intended for once-only use in a swimming pool or for one-time use in a swimming pool filter.

Safety considerations favour the use of insoluble ion-exchange compounds such as lanthanum oxide or carbonate rather the precipitants such as lanthanum or zirconium chloride, but there may still be a concern that the carbonates and oxides will be converted to the chlorides in stomach acid. The ion-exchange reagents may therefore be formulated with a non-toxic sulphate compound so that any chloride which forms in the stomach is immediately converted to the innocuous sulphate. Aluminium sulphate is a convenient sulphate to employ because it is useful as a flocculant-type carrier and as a pH buffer for pool waters. Sodium sulphate may also be employed and, if so, it is recommended that the ratio of sodium sulphate to reagent on a dry weight basis be 1:1 to 3:1. Alternatively, it is recommended that 15–25% by dry weight of the composition be sodium sulphate. 15–25% of sodium chloride may also be employed with advantage. Safety and convenience considerations also suggest that the particulate ion-exchange compositions should be formulated as aqueous slurries or pastes rather than free-flowing fine powders.

The phosphate scavenging ability of the preferred reagents will be impaired in water that is too acid (<pH 6) or too alkaline (>pH 10). While pools with these characteristics have been seen, they are poorly buffered so that a small amount of material with good pH buffering capabilities (such as sodium carbonate or aluminium hydroxide) will be able to hold the pool pH at between pH 6.5 and pH 8 (preferably at pH 7.6) for sufficient time for the phosphate scavenging reaction to be completed and chloramines substantially reduced. The compositions may therefore be formulated to include such a pH buffer and, if formulated as a paste or slurry, will themselves have a pH with this range.

The ratios or proportions of the components can vary widely but will normally be based upon the amount of active reagent required to react with substantially all of the phosphate within a pool. This, in turn, will depend upon the choice of active agent as activity can vary widely within the group of agents identified. Where a carrier comprising a flocculant and carrier particles is employed, it has been found that each need to be between one and three times the weight of the active reagent particles. A similar amount of pH buffer may be needed, but it will be appreciated that the $Al(OH)_3$ and sulphate derived from the neutralisation of $Al_2(SO_4)_3$ will serve effectively as (i) a carrier, (ii) a pH buffer and (iii) a shield in the event of ingestion. Of course, sufficient water will be needed to create a slurry or paste of the desired consistency.

It will be appreciated from the above that a variety of different methods for treating swimming pools are envisaged, methods which may be used alone or in combination with one another:

1 Finely-divided ion-exchange/catalyst reagents may be mixed directly into the pool (eg, using the pool pump with the filter by-passed) to remove the target nutrient(s) from the pool water. The particulate reaction products may then be physically removed from the pool by vacuuming-to-waste or by circulating the pool water through the pool filter.

2 Finely-divided reagents may be mixed directly into the pool (as above) together with a carrier material comprising a flocculating agent or gel and allowed to settle and then removed from the pool. The flocculating agent may be of the well known types using iron or aluminium salts such as aluminium hydroxide $Al(OH)_3$. The gel may be inorganic alumino-silicates or long-chain organic molecules such as a polyacrylamide gel.

3 Heavy, agglomerated reagent particles (with or without linkage to larger neutral carrier particles) or composite beads incorporating reagents may be added directly to the pool water, allowed to settle and then removed by vacuuming.

4 Agglomerated reagent particles or composite beads (as in #3) may be added to the pool filter bed and pool water circulated through the filter bed to remove the target nutrients.

5 Light agglomerated reagent particles or composite beads may be added to the pool, allowed to rise to the surface and skimmed off.

6 The composition may be contained in a separate reactor vessel and pool water circulated there-through, with or without cyclic regeneration.

DESCRIPTION OF EXAMPLES

Having broadly portrayed the nature of the present invention, particular examples of the use of the invention will now be described by way of illustration only.

EXAMPLE 1

A 50,000 litre (l) uncovered swimming pool located in a suburban garden is used almost daily in the summer months by a family with children who are usually joined by friends in the pool at the weekends. On first inspection, the water was dull but not noticeably green, though there was a patina of algal growth on the walls, and both the walls and the bottom were slimy to touch. The pool was fitted with a diatomaceous earth filter, a roof-mounted solar heater and pump system with a capacity of 10,000 ltr/hr and a moving suction-head bottom-cleaner. Maintenance was heavy: the filter was operated for at least 8 hours per day (usually with the moving suction-head in action) and backwashed on the average once every 10 days; the sides of the pool were manually scrubbed with a long-handled brush at least once a week; 300 gm hypochlorite was added daily with 10 to 50 grams of cyanurate stabiliser, 50 to 200 grams of sodium bisulphate and 50 to 200 ml of algacide. In addition, floating leaf and insect litter was removed at least once a day using a long-handled net. The pool had a strong chloramine odour and the users complained of stinging eyes. Measurements revealed a water temperature of 25° C., a pH of 6.5, chlorine at 1.5 ppm, combined chlorine (an indicator of chloramines) at 1.8 ppm and phosphorus as phosphates at 450 ppb (ie, approximately 25 gm of phosphorus in the pool).

Given the user's wish not to interrupt pool usage, the filter supports were inspected to ensure that there were no holes or tears and a slurry of 150 gm of lanthanum carbonate power (with a particle size of about 5 μm) was prepared and added to a fresh diatomaceous earth filter bed by pouring the slurry into the skimmer box while the pump was circulating water through the filter. The filter was then operated 14 hours per day for a week (while chlorine addition was maintained) and then backwashed, at which time the phosphate concentration had been reduced to about 2 ppb, combined chlorine was about 650 ppb, the water was noticeably more clear, the walls were no longer slimy to touch, there was no visible trace of algae, there was no odour of chloramines and the pool pH had naturally risen to 7.5. Thereafter, only 450 gm hypochlorite was added per week, no other chemicals were used (including lanthanum carbonate), the filter was operated only one or two hours per day (usually without the suction-head), wall-brushing was undertaken only once every four weeks, filter backwashing was needed only after 105 days. The pool still had no noticeable chloramine odour, appeared crystal-clear and sparkling and the users reported much more comfortable and pleasant swimming without eye-sting or the need to use goggles. At the end of the season, after more than three months of use with this low level of maintenance, phosphate concentrations had risen to about 100 ppb and a detectable slime had returned to the sides of the pool.

EXAMPLE 2

An uncovered suburban pool of 20,000 with a sand filter is used for only one or two weeks a summer when grandchildren visit the elderly owners; it is generally unused for 11 months of the year and occasionally not used at all for 23 months. The owners wish to keep the pool looking clean but find the cost and effort of pool maintenance a heavy burden. When inspected, the walls and bottom of the pool were green with algae, though they were still visible. The pool was said to have been in this condition for some months. Maintenance comprised adding 200 gm hypochlorite to the pool, waiting for a day, then running the filter a few hours once a week until it needed backwashing and then backwashing the filter. Phosphorus as phosphate was measured at 50 ppb (approximately 1 gm phosphorus in the pool), pH at 7.5 and chlorine at 0.4 ppm (the day after the last treatment).

The pool was treated as follows: the algae was killed by the addition of 1 kg of hypochlorite. After 24 hours, the walls and bottom of the pool were scrubbed with a long-handled brush and the debris allowed to settle for a further day before being vacuumed to waste. The filter was then run for a 8 hours, backwashing twice. Given the use of $La_2(CO_3)_3$ as the active phosphate-scavenging reagent, the amount required was estimated by assuming that La would couple stoichiometrically to the pool P and allowing a safety factor of 2. A slurry composition was prepared with this reagent using diatomaceous earth for the carrier particles, and $Al(OH)_3$ as a carrier linker/floc in the following manner. Given that $LaPO_4$ will be formed, the actual weight ratio of La to P will be theoretically 4.5 gm:1 gm; ie, approximately 10 gm equivalent weight of La will be required, allowing for the safety factor. Assuming that the La is added in the form of $La_2O_3$ or $La_2(CO_3)_3$ the weight of these compounds required will be, respectively, about 11 gm and 17 gm.

The linker/floc used in this example was $Al(OH)_3$, and assuming that Al:La is 2:1, it was calculated that 10 gm $Al(OH)_3$ was required. Adding the Al to the composition as $Al_2(SO_4)_3$, about 44 gm will be required, ignoring water of hydration. In this example, diatomaceous earth was used as the inert carrier particles, at least the same amount as the $Al_2(SO_4)_3$ and $La_2O_3$ or $LaCl_3$ combined being required. In this example, about 60 g of diatomaceous earth was used. The $Al_2(SO_4)_3$ and the $LaCl_3$ are first each separately mixed with 100 ml water, then combined and the diatomaceous earth is added. This slurry was found to have a pH of about 4. To raise this pH and to provide the pH buffering capacity needed within the pool, an aqueous solution of $Na_2CO_3$ was added to the slurry (while stirring) to bring the pH to 8. About 125 g $Na_2CO_3$ in 200 ml water was required. The resultant slurry to be added to the pool was about 500 ml and weighed about 0.8 kg. It had the following component moieties: $SO_4^{2-}$, $Al(OH)_3$, $La_2(CO_3)_3$, $CO_3^{2-}$ (assuming an excess of $Na_2CO_3$ was employed, as is desirable), $H_2O$, $Cl^-$ (if $LaCl_3$ was used) and $Na^+$.

The slurry composition was mixed in the pool using the pool pump with the filter by-passed, the slurry being poured into the skimmer box, and the pump was left running to continue the mixing for a few minutes and the water was uniformly cloudy. The pump was then turned off and the floc allowed to form and settle overnight, at which time the pool water was clear and a layer of whitish-grey floc was evident on the bottom. After this floc was vacuumed to waste, the walls and bottom of the pool were lightly scrubbed again and filter was operated for about five hours. Pool phosphate concentrations were monitored after initiation of the treatment and were found to have dropped within a few minutes to about 3–4 ppb, indicating a very rapid and effective scavenging action. At the end of the treatment (with the water thoroughly mixed), the pool appeared crystal clear and the phosphate concentration was found to be 1 ppb. The only maintenance then undertaken for the next 12 months was to hand-skim the pool of leaves and insects and to operate the filter and suction-head a few hours per week, backwashing being require about once a month. Since the pool was not being used, hypochlorite was not added and no other chemicals were used. After 12 months the phosphate concentration was found to be about 80 ppb and the pH 7.5, the water still being clear. All that was required before the pool was used again was to add 200 gm of hypochlorite.

EXAMPLE 3

Styrene-based polymeric ion-exchange beads of 250–700 μm incorporating up to 75% lanthanum carbonate particles of 5–10 μm were made in the manner disclosed in Example 12 of Australian patent No 534337. That is, styrene-4-vinylpyridine copolymer (15 g) was dissolved into styrene (120 g) and divinylbenzene monomers (8 g), to which solution was added the lanthanum carbonate particles (60 g) and the mixture was milled using glass beads to ensure uniformity. Benzoyl peroxide (0.8 g) was added to the mixture as an initiator and the mixture further milled before separating the glass beads by filtering through a coarse sieve. The filtrate was dispersed into a suspension of polyvinyl alcohol (650 g of 10% solution) dissolved in 1 litre of a 30% calcium chloride solution. The composite was stirred until the desired bead size was obtained and the suspension was heated to 78° C. to initiate polymerisation, whereupon the beads were sieved out and washed with warm water. 250 g of the beads were added to the sand filter of a pool like that of Example 1 and the filter was operated continuously for four days. Phosphate concentrations in the pool water were monitored during this time and were found to fall logarithmically from 400 ppb to 30 ppb in a manner consistent with the assumption that the phosphate removal efficiency of the beads within the filter was 90–95%.

EXAMPLE 4

The beads formed in accordance with Example 3 were recovered by back-washing the sand filter, about 90% (w/w) being recovered. These beads were washed in tap water to remove surface contaminants and added to a beaker containing 500 ml of an aqueous solution of sodium hydroxide and carbonate at pH 12 and stirred for 10 minutes at 30° C. to convert the lanthanum phosphate to lanthanum hydroxide/carbonate. The beads were then filtered and transferred to 500 ml of an aqueous solution of sodium carbonate/bicarbonate at 30° C. and pH 7 to convert the lanthanum hydroxide to lanthanum carbonate, the pH being reduced to about 8 in so doing.

The re-charged beads were then washed in distilled water at pH 7.5, removed and dried. 1 gm of the dried beads were then added to a flask containing 5000 ml of distilled water at 20° C., and buffered with sodium bicarbonate to pH 7.5. 1 ml of 0.01% pool hypochlorite was then added to raise the chlorine content of the water to 2 ppm to simulate a normal pool. Sodium phosphate was then added to the water (to simulate a phosphate nutrient concentration of 400 ppb and the water was stirred for 30 minutes while 10 ml samples water were taken every minute.

An equal weight of virgin beads formed as described in Example 3 were subjected to the same treatment as the reformed beads. The results indicated that the capacity of the reformed beads to scavenge phosphate was about 92% of that of the virgin beads and that (assuming the lost capacity was due to leaching and/or poisoning of the active agent from the reformed beads) there was no measurable difference in the specific rate of uptake of phosphate between the virgin and the reformed beads.

EXAMPLE 5

Silicate-aluminate beads were formed as follows. A 2:1 aluminate-silicate mix was formed and 100 gm was added to 900 ml of an aqueous sodium hydroxide solution of pH 12 to make up approximately 1000 ml of alumino-silicate solution. 100 gm of −20 µm lanthanum carbonate powder and 10 gm sodium carbonate (to ensure excess carbonate) were thoroughly mixed into the solution and hydrochloric acid was gradually added to return the pH to 7.5–8.0 and set the gel. After setting, the gel was macerated and sieved to produce a first fraction of 20–200 µm, a second fraction of 200–2500 µm and a third fraction of >2500 µm which was returned for further maceration.

Laboratory evaluation using simulated pool water confirmed that substantially all of the lanthanum carbonate in the beads of −2500 µm was accessible by phosphate ions and that the rate of reaction varied only slightly more than inversely as the square of the bead diameter. The matrix material therefore appeared to present little inhibition to the ion-exchange process. Reactivity was confirmed by mixing beads of the first fraction directly into a simulated pool and allowing them to settle, and by adding beads of the second fraction to a sand filter and passing pool water through it. The latter beads could be readily removed from the filter by normal backwashing.

Summary of Benefits of the Examples

The benefits evident from Examples 1 and 2 over the conventional pool management methods include the following:

1. Management of a swimming pool to achieve a given level of water quality is simplified and rendered less expensive, requiring less labour, materials and energy.
2. The pool can be left unattended and unused for longer periods of time without fear of an algal bloom.
3. Fewer toxic chemicals in lesser amounts are required.
4. There is less environmental impact from discharged pool waters, and from the storage, transport, use, and spillage of pool chemicals.
5. The risk of poisoning from toxic chemicals is reduced.
6. Less chlorine smell and less "stinging eyes" resulting from chloramines.
7. Capital expenditure on automatic chlorine/ozone generators and mechanical sweepers can be reduced.
8. Less energy for pumping of water is required.
9 Less wear on pumping and filtration systems.

Though a range of preferred and possible pool treatment methods and compositions have been offered, chemists will appreciate that many modifications to these methods and compositions—along with many alternatives—are possible without departing from the broad and general principle of controlling algal growth in swimming pools by removing nutrients essential for the algae.

What is claimed is:

1. A composition for use in the removal of dissolved phosphate from swimming-pool water comprising:
   a finely divided particulate reagent compound selected from the group consisting of compounds of elements of the lanthanide series, compounds of yttrium, and compounds of zirconium, said reagent compound being substantially insoluble in swimming-pool water of pH 6–8 and being adapted, upon contact with the pool water, to react with the dissolved phosphate to produce a finely divided particulate reaction product comprising a phosphate compound which is also substantially insoluble in pool water at pH 6–8, and
   a water-permeable and dispersible carrier material linking the particles of said reagent compound so that, upon contacting said carrier and reagent particles with pool water containing phosphate, the particles of the phosphate-containing reaction product are linked by said carrier material,
   the combination of carrier material and reagent, and the combination of the carrier material and the reaction product being substantially insoluble in pool water at pH 6–8.

2. A composition according to claim 1, wherein said reagent compound comprises particulate lanthanum oxide or carbonate having an average particle size of less than 5 µm,
   said carrier material comprises a hydrophilic floc or gel within which the reagent particles are dispersed, and
   the composition is formulated as an aqueous paste or slurry having a pH-buffering capacity adapted to hold the pH of the pool water between 6.5 and 10 when the composition is dispersed therein.

3. A composition according to claim 1, wherein said reagent compound comprises particulate lanthanum carbonate having an average particle size of less than 5 µm, and
   said carrier material comprises a mixture of (i) a hydrophilic floc or gel within which the reagent particles are dispersed and (ii) a water-soluble non-toxic sulphate compound having an equivalent weight of sulphur at least equal to that of lanthanum in the reagent compound.

4. A composition according to claim 3, comprising 10–20% lanthanum carbonate, 5–15% aluminium hydroxide, 15–25% sodium sulphate and 15–25% sodium chloride, a minor amount of flocculant, and substantially the balance of water.

5. A composition according to claim 1, wherein the reagent particles comprise lanthanum carbonate having an average particle size of less than 10 µm.

6. A composition according to claim 5, wherein the carrier material comprises a hydrophilic floc or gel within which the reagent particles are dispersed and embedded.

7. A composition according to claim 5, wherein the carrier material comprises discrete particles of a hydrophilic polymeric material having an average particle size between 50 and 2500 µ, and wherein the reagent particles are embedded within said carrier particles.

8. A composition according to claim 1, wherein said reagent compound comprises particulate lanthanum oxide or carbonate having an average particle size of less than 5 µ, the carrier material includes carrier particles of a porous substance which is substantially inert in pool water and which has a particle size less than 50 µm, and said reagent particles and said carrier particles are linked together by a hydrophilic floc or gel.

9. A composition according to claim 8, wherein said hydrophilic floc or gel includes aluminium hydroxide and sodium sulphate, the ratio of carrier to reagent, calculated on a dry weight basis, is 1:1 to 3:1, the ratio of aluminium hydroxide to reagent, calculated on a dry weight basis, is 1:1 to 3:1, and the ratio of sodium sulphate to reagent compound, calculated on a dry weight basis, is 1:1 to 3:1.

* * * * *